United States Patent
Salter et al.

(10) Patent No.: US 10,543,814 B2
(45) Date of Patent: Jan. 28, 2020

(54) HEATED AND ILLUMINATED WIPER ASSEMBLY

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Cornel Lewis Gardner, Romulus, MI (US); Andre Sykula, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 15/263,873

(22) Filed: Sep. 13, 2016

(65) Prior Publication Data

US 2018/0072274 A1 Mar. 15, 2018

(51) Int. Cl.
*B60S 1/38* (2006.01)
*B08B 1/00* (2006.01)
*B60Q 1/26* (2006.01)
*B60S 1/04* (2006.01)

(52) U.S. Cl.
CPC ............ *B60S 1/3805* (2013.01); *B08B 1/001* (2013.01); *B60Q 1/2603* (2013.01); *B60Q 1/2684* (2013.01); *B60S 1/0491* (2013.01); *B60Q 2400/40* (2013.01)

(58) Field of Classification Search
CPC ........ B60S 1/3805; B60S 1/38; B60S 1/0491; B60S 1/3803; B60Q 1/2603; B60Q 1/2684; B60Q 2400/40

USPC ...... 15/250.351, 250.001, 250.361; 362/487, 362/503
See application file for complete search history.

(56) References Cited

U.S. PATENT DOCUMENTS

| | | | | |
|---|---|---|---|---|
| 2,650,355 | A | * 8/1953 | Pieczonka | B60Q 1/2684 15/250.001 |
| 2,677,143 | A | * 5/1954 | Blaney | B60S 1/32 15/250.06 |
| 5,276,937 | A | * 1/1994 | Lan | B60S 1/32 15/250.001 |
| 5,649,337 | A | 7/1997 | Lobner | |
| 5,867,094 | A | * 2/1999 | Tonne | B60Q 1/2684 15/250.001 |
| 6,028,291 | A | 2/2000 | Heisler | |
| 6,100,499 | A | 8/2000 | Davila, Sr. | |
| 6,353,961 | B1 | * 3/2002 | Lin | B60Q 1/2684 15/250.001 |
| 6,678,915 | B1 | * 1/2004 | Ravenell | B60S 1/3805 15/250.05 |
| 7,137,723 | B2 | 11/2006 | Hwan | |
| 7,246,403 | B2 | * 7/2007 | Ohyama | B60Q 1/2684 15/250.001 |

(Continued)

FOREIGN PATENT DOCUMENTS

JP  1-223052  * 9/1989
JP  6-156198  * 9/1994

*Primary Examiner* — Gary K. Graham
(74) *Attorney, Agent, or Firm* — Jason Rogers; Vichit Chea; King & Schickli, PLLC

(57) ABSTRACT

A wiper assembly includes a wiper arm, a wiper blade carried on the wiper arm and a light source provided between the wiper arm and the raised wiper blade. The wiper assembly may also include a heating element and a controller to control operation of the light source and the heating element.

14 Claims, 4 Drawing Sheets

(56) References Cited

U.S. PATENT DOCUMENTS

| | | | | |
|---|---|---|---|---|
| 8,664,867 B1* | 3/2014 | Wood | ............. | B60S 1/0491 |
| | | | | 15/250.02 |
| 9,003,595 B2 | 4/2015 | Jones | | |
| 2005/0246852 A1* | 11/2005 | Shen | ............. | B60S 1/3801 |
| | | | | 15/250.201 |
| 2006/0046684 A1* | 3/2006 | Kameyama | ............. | B60Q 1/50 |
| | | | | 455/345 |
| 2007/0084008 A1* | 4/2007 | Hwa | ............. | B60S 1/3806 |
| | | | | 15/250.201 |
| 2015/0135462 A1 | 5/2015 | Caillot et al. | | |

* cited by examiner

HEATED AND ILLUMINATED WIPER ASSEMBLY

TECHNICAL FIELD

This document relates generally to the motor vehicle equipment field and, more particularly, to a heated and illuminated wiper assembly that provides a number of benefits and advantages for an operator of a motor vehicle equipped with the wiper assembly.

BACKGROUND

Heated wiper assemblies including a heated wiper arm and/or wiper blade are very effective in removing and preventing the buildup of ice and snow on the windshield of a motor vehicle. As such, heated wiper assemblies provide for enhanced visibility which greatly benefits the motor vehicle operator in inclement winter weather conditions.

This document relates to a new and improved wiper assembly that is both heated and illuminated as well as to related methods of clearing ice and snow from a windshield and greeting or welcoming an operator as the operator approaches the motor vehicle.

SUMMARY

In accordance with the purposes and benefits described herein, a wiper assembly is provided for a motor vehicle. That wiper assembly comprises a wiper arm, a wiper blade carried on the wiper arm and a light source provided between the wiper arm and the wiper blade. That light source may be carried on an inside surface of the wiper arm.

The wiper assembly may further include a heating element. The light source and the heating element may be connected with a common ground to more closely tie light source function with heater element function. The wiper assembly may also include a control module having a controller configured to control operation of the light source and the heating element. That controller may be further configured to activate the light source only when the wiper blade is adjacent a bottom stroke position as it sweeps across the windshield. Further, the controller may be configured to (1) ramp up light intensity from the light source when the wiper blade approaches the bottom stroke position and the light source is activated and (2) ramp down the light intensity from the light source when the wiper blade rises from the bottom stroke position and the light source gets deactivated.

That controller may also be configured to vary light intensity of the light source based upon current ambient light intensity. Still further, the controller may be configured to activate the light source and the heating element when (a) precipitation is detected, (b) the ambient temperature is below a predetermined temperature, (c) an ignition of the motor vehicle to which the wiper assembly is connected is switched off and (d) an operator approaches the motor vehicle.

Further, the controller may be configured to operate the light source and the heating element (a) at a first when intensity level when (a) precipitation is detected, (b) the ambient temperature is below the predetermined temperature, (c) the ignition of the motor vehicle is switched off and (d) the operator approaches the motor vehicle and (2) at a second intensity level once the ignition of the motor vehicle is subsequently switched on wherein the first intensity level is greater than the second intensity level.

Still further, the controller may be configured to operate the light source and the heating element at a raised intensity when precipitation is detected on the windshield and the ambient temperature is below a predetermined temperature.

Further, in any of the embodiments of the wiper assembly, the light source may emit visible light in the red frequency range.

In accordance with an additional aspect, a method is provided of cleaning ice and snow from a windshield with a wiper assembly. That method comprises heating a wiper blade of the wiper assembly, sweeping the wiper blade across the windshield between a bottom stroke position and a top stroke position and activating, by a controller, a light source carried on the wiper assembly only when the wiper blade is adjacent the bottom stroke position.

In accordance with still another aspect, a wiper assembly is provided comprising a wiper arm, a wiper blade carried on the wiper arm, a heating element for heating the wiper blade, a light source and a controller configured to activate the light source only when the wiper blade is adjacent a bottom stroke position.

In accordance with still another aspect, a wiper assembly is provided which comprises a wiper arm, a wiper blade carried on the wiper arm, a light source and a controller configured to vary light intensity of the light source based upon current ambient light intensity.

In accordance with yet another aspect, a wiper assembly is provided that comprises a wiper arm, a wiper blade carried on the wiper arm, a heating element for heating the wiper blade, a light source and a controller. That controller is configured to activate the light source and the heating element when (a) precipitation is detected, (b) ambient temperature is below a predetermined temperature, (c) an ignition of the motor vehicle to which the wiper assembly is connected is switched off and (d) an operator approaches the motor vehicle.

In accordance with still another aspect, a wiper assembly is provided for a motor vehicle wherein that wiper assembly comprises a wiper arm, a light source carried on the wiper arm and a controller configured to activate the light source when an operator approaches the motor vehicle. In addition, an associated method of welcoming an operator as the operator approaches the motor vehicle comprises the steps of locating a light source on a wiper arm of the motor vehicle and activating the light source via a controller when the operator approaches the motor vehicle.

Still further, in accordance with yet an another additional aspect, a wiper assembly is provided for a motor vehicle which comprises a wiper arm, a wiper blade carried on the wiper arm, a heating element for heating the wiper blade, a light source and a controller. That controller is configured to operate the light source and the heating element at a raised intensity when precipitation is detected on the windshield and the ambient temperature is below a predetermined temperature.

In the following description, there are shown and described several preferred embodiments of the wiper assembly and the related methods of clearing ice and snow from a windshield and welcoming an operator to the motor vehicle. As it should be realized, the wiper assembly and methods are capable of other, different embodiments and their several details are capable of modification in various, obvious aspects all without departing from the wiper assembly and methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wiper assembly and together with the description serve to explain certain principles thereof. In the drawing figures.

Reference will now be made in detail to the present preferred embodiments of the wiper assembly, examples of which are illustrated in the accompanying drawing figures.

DETAILED DESCRIPTION

Figure 1:
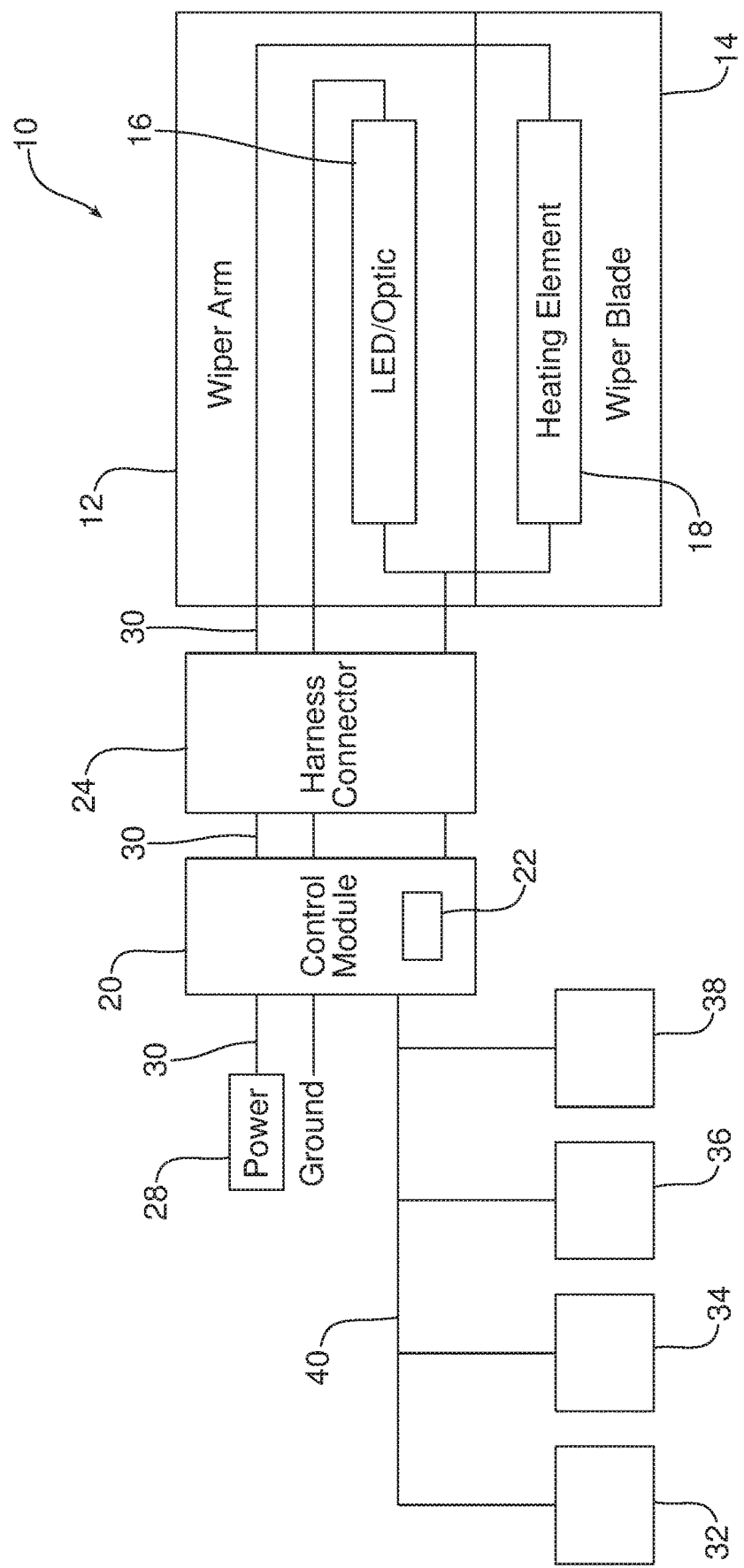
FIG. 1 is a schematic block diagram illustrating the wiper assembly in a first possible operating environment.

Reference is now made to FIG. 1 which is a block schematic diagram of the wiper assembly 10. In the illustrated embodiment, the wiper assembly 10 includes a wiper arm 12 and a wiper blade 14 carried on the wiper arm. The wiper assembly 10 also includes a light source 16 and a heating element 18.

The light source 16 may comprise, for example, a printed light emitting diode (LED), an organic light emitting diode (OLED), an LED light pipe or other appropriate illuminating device. The heating element 18 may comprise, for example, a resistive heating element that may extend along the wiper arm 12, through the wiper blade 14 or along the wiper arm and through the wiper blade.

Figure 3:
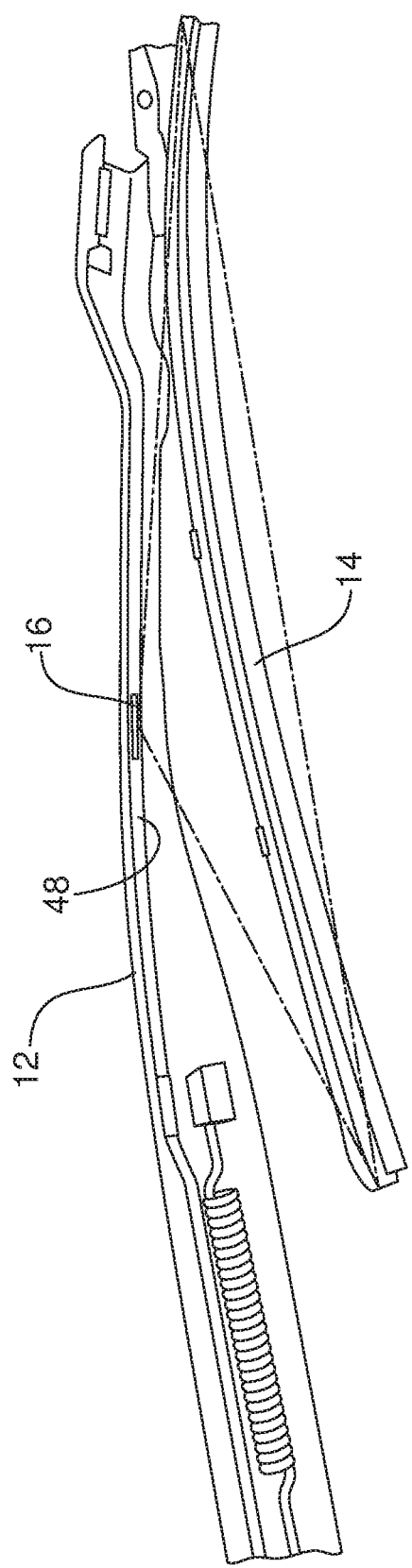
FIG. 3 is a detailed perspective view of the wiper assembly illustrating the light source carried on the inside of the wiper arm between the wiper arm and the wiper blade.

In one possible embodiment that is best illustrated in FIG. 3, the light source 16 is carried on an inside surface of the wiper arm 12, so that the light source and any optics associated therewith are effectively provided between the wiper arm 12 and the wiper blade 14.

As further illustrated in FIG. 1, the wiper assembly 10 may also include a control module 20 which includes a controller 22. Controller 22 comprises a computing device such as a dedicated microprocessor or electronic control unit (ECU) operated in accordance with instructions from appropriate control software. Thus, the controller 22 may comprise one or more processors, one or more memories and one or more network interfaces which all communicate with each other over a communication bus.

The controller 22 is configured to control the operation of the light source 16 and the heating element 18. In the illustrated embodiment, the controller 22 is connected to the light source 16 and the heating element 18 by means of the harness connector 24. As also illustrated in FIG. 1, the light source 16 and the heating element 18 may be connected with a common ground. Power from a power source 28 is provided to the light source 16 and heating element 18 through the control module 20 and the harness connector 24 along power line 30.

As also illustrated in FIG. 1, the control module 20 is connected to various devices or sensors 32, 34, 36, 38 via a local interconnected network or LIN 40. In the illustrated embodiment, the device or sensor 32 provides ambient temperature data to the control module 20, the device or sensor 34 provides precipitation data to the control module, the device or sensor 36 provides ambient light data to the control module and the device or sensor 38 provides battery voltage data to the control module. In this first operating environment illustrated in FIG. 1, the data from the devices or sensors 32, 34, 36, 38 is supplied directly to the control module 20 over the LIN 40.

Figure 2:
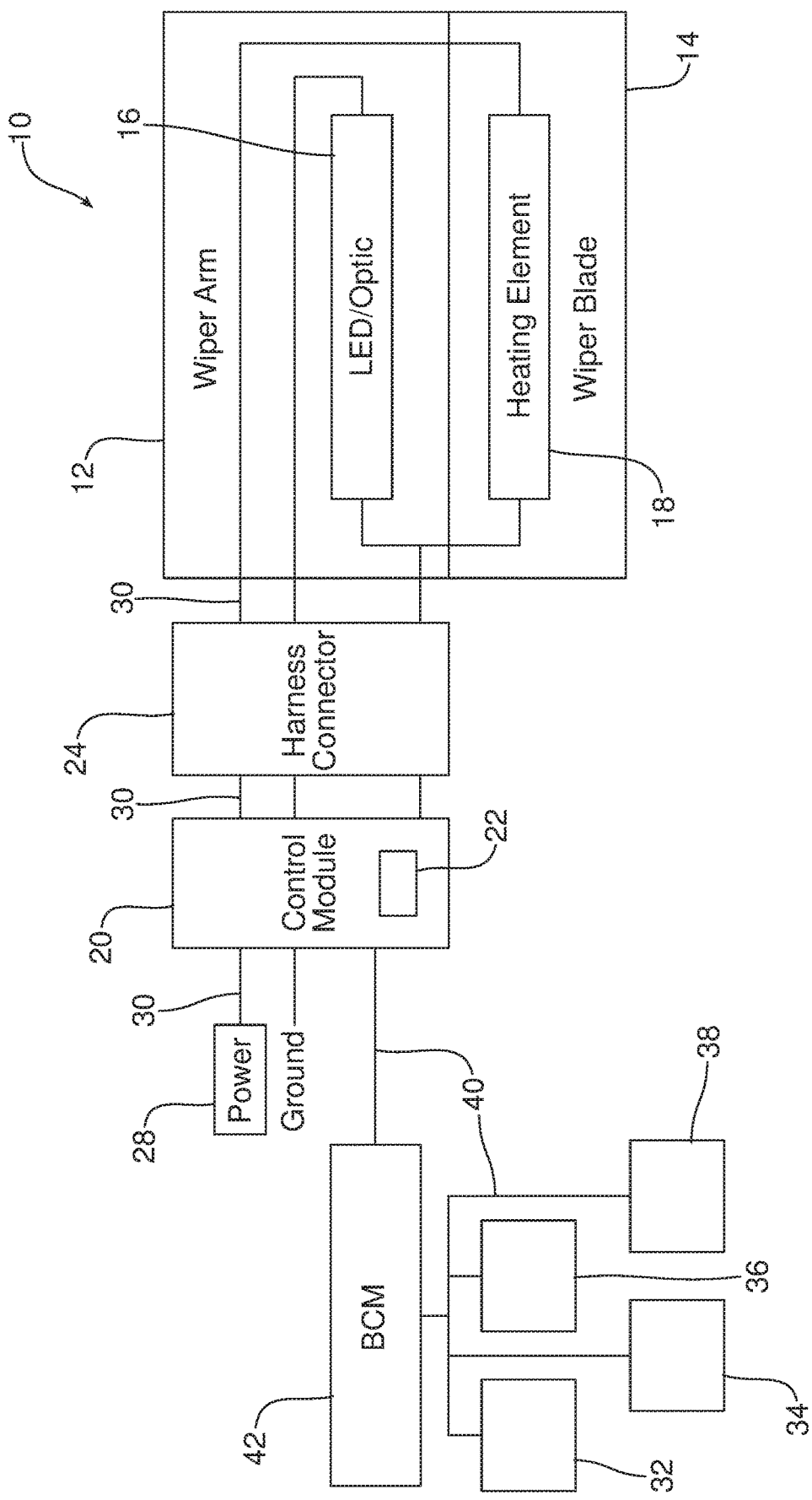
FIG. 2 is a schematic block diagram illustrating the wiper assembly in a second possible operating environment.

Reference is now made to FIG. 2 illustrating a second possible operating environment wherein components corresponding to those illustrated in the first operating environment of FIG. 1 are identified by identical reference numbers for simplicity and brevity in description. The only difference between the first operating environment illustrated in FIG. 1 and the second operating environment illustrated in FIG. 2 is the presence of the body control module or BCM 42. As is known in the art, a BCM 42 may comprise a computing device having one or more processors, one or more memories, one or more network interfaces, a human interface, a GPS/geolocator component, a display device such as a multi-function display with touchscreen capability and a speech processor that all communicate with each other over a communication bus. A BCM 42 may perform a number of interior body electrically based functions including, for example, interior locking, remote key entry, interior lighting, exterior lighting, and the like. In some embodiments, the BCM 42 may also function to control entertainment functions (e.g. radio, CD player and communications such as telephone and internet communications over a wireless network). In some embodiments, the BCM 42 is connected by a communication bus (not shown) to other control modules that provide one or more of these other functions.

In the embodiment illustrated in FIG. 2, the device or sensor 32 for providing ambient temperature data, the device or sensor 34 for providing precipitation data, the device or sensor 36 of providing ambient light data and the device or sensor 38 for providing battery voltage data are all connected by the LIN 40 to the BCM 42 which is then connected to the control module 20 by the LIN. Thus, in this second operating environment, the data from the devices or sensors 32, 34, 36, 38 is routed to the BCM 42 which then communicates that data to the control module 20 over the LIN 40.

In either of the embodiments illustrated in FIGS. 1 and 2, the controller 22 of the control module 20 may be configured to operate in a number of very specific ways in order to provide benefits and advantages to the motor vehicle operator.

In one possible embodiment, the controller 22 may be configured to activate the light source 16 only when the wiper blade 14 on the wiper arm 12 is adjacent a bottom stroke position P1 at the bottom of the windshield 44. See FIG. 4. As a consequence, illumination from the light source 16 is barely visible above the black band 46 at the bottom of the windshield 44. Consequently, the light source 16 provides a warm glow of indirect light. Here it should be appreciated that the black band 46 typically incorporates a blackout and dot pattern. That pattern may be reduced in the area of the windshield 44 where the soft glow from the light source 16 is directed so that that glow will be visible to the operator of the motor vehicle thereby allowing the operator to confirm that the heating element 18 is activated. Here it should be noted that the light source 16 may be designed to emit only visible light in the red frequency range. The red color implies warmth and heat thereby providing a familiar indication of the activation of the heating element 18. Further, red light ensures a minimal effect on night vision known as the Purkinje effect: which is the tendency for the peak luminance sensitivity to the human eye to shift toward the blue end of the color spectrum at low illumination or ambient light levels.

As should be appreciated, the light source 16 may include any desired or necessary optics to ensure the desired lighting effect. The light source 16 may also be protected down in the channel 48 on the underside of the wiper arm 12 where it can provide and function for a long service life. See FIG. 3.

Figure 4:
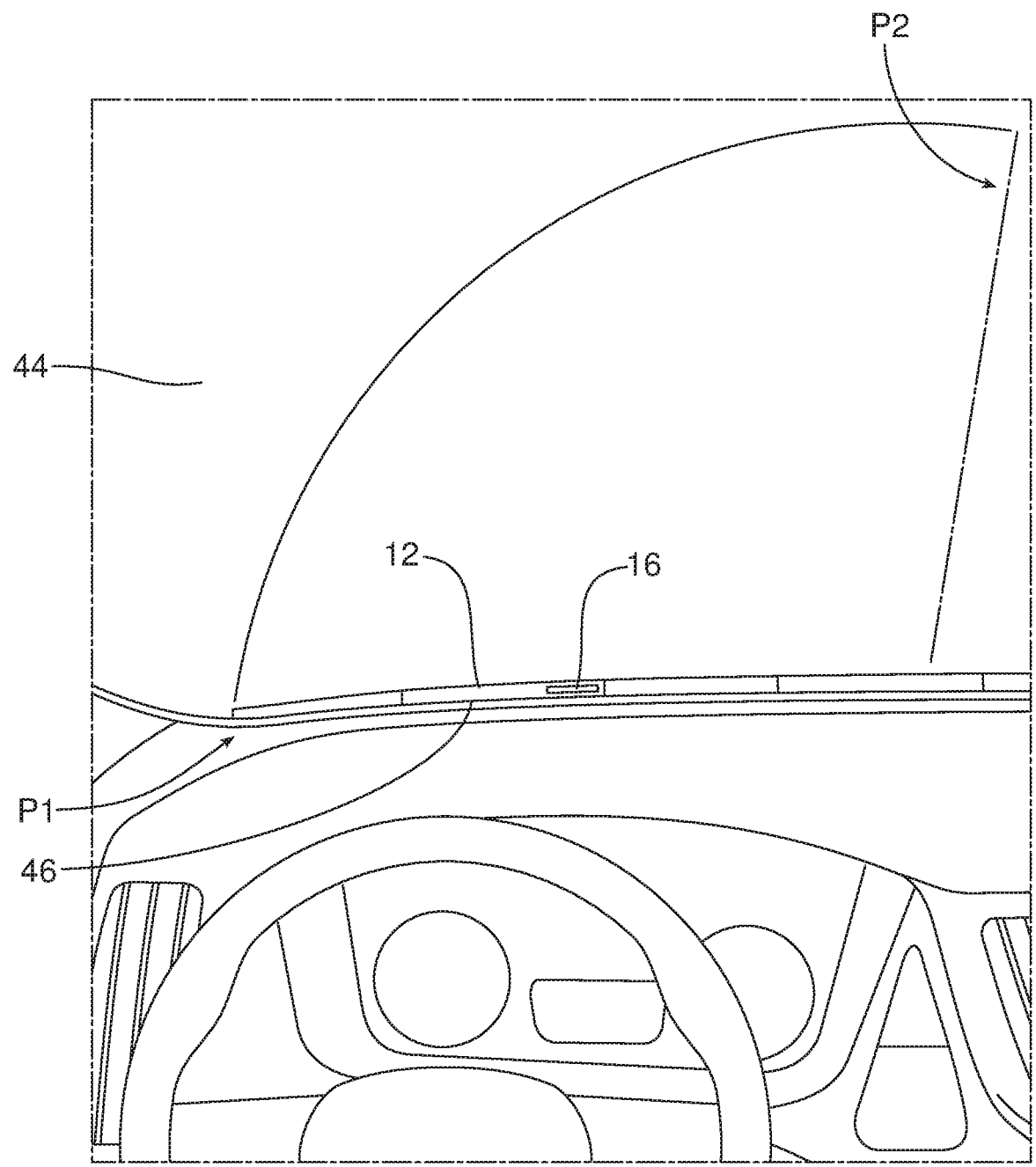
FIG. 4 is a schematic illustration of the operation of the wiper assembly showing how the light source illuminates the bottom section of the windshield when the wiper blade is at the bottom stroke position.

In one particularly useful embodiment, the controller 22 may be configured to (1) ramp up the light intensity from the light source 16 as the wiper blade 14 approaches the bottom stroke position P1 at the bottom of the windshield 44. Further, the controller 22 may be configured to (2) ramp down the light intensity from the light source 16 when the wiper blade 12 rises from the bottom stroke position and the light source is deactivated. Operation of the light source 16 only when it is at or near the bottom stroke position P1 on the windshield 44 as illustrated in FIG. 4 ensures minimal distraction to the driver of the motor vehicle while allowing the driver to quickly and easily confirm operation of the heating element 18 to remove and prevent the buildup of ice and snow on the motor vehicle windshield 44.

It should also be appreciated that the controller 22 may be configured to vary the light intensity of the light source 16 based upon the current ambient light intensity or conditions as indicated by data received from the ambient light device or sensor 36.

The controller 22 may also be configured to activate the light source 16 and the heating element 18 when certain conditions are met. In one possible embodiment, the controller 22 may be configured to activate the light source 16 and the heating element 18 when (a) precipitation is detected on the windshield 44 by the precipitation device or sensor 34, (b) ambient temperature is detected to be below a predetermined temperature (e.g. 0-3 degrees C.) by the ambient temperature device or sensor 32, (c) an ignition of the motor vehicle to which the wiper assembly 10 is connected is switched off as indicated via a data signal from the BCM 42 and (d) an operator approaches the motor vehicle. Where the operator carries a key fob (not shown) coded to the motor vehicle, operator approach can be detected in a manner known in the art and data indicating that approach may be provided to the control module 20 from the BCM 42 over the LIN 40.

Consistent with the above, the controller 22 may also be configured to operate the light source 16 and the heating element 18 (1) at a first intensity level when (a) precipitation is detected on the windshield 44, (b) the ambient temperature is below the predetermined temperature, (c) the ignition is switched off and (d) the operator approaches the motor vehicle and (2) at a second intensity level once the ignition is subsequently switched on where the first intensity level is greater than the second intensity level. Thus, for example, in order to ensure that the wiper assembly 10 is free of snow and ice buildup once the motor vehicle operator reaches the vehicle, the heating element 18 may be operated at a higher intensity of, perhaps, three times normal to free the wiper assembly from ice and snow in a quick and efficient manner while the increase in light intensity informs the approaching operator that the heating element is active. The heating element 18 and the light source 16 may then again be operated at normal intensity once the ignition of the motor vehicle is switched on.

The controller 22 may also be configured to operate the light source 16 and the heating element 18 at a raised intensity whenever precipitation is detected on the windshield 44 and the ambient temperature is below the predetermined temperature.

Consistent with the above description, a method is provided of clearing ice and snow from a windshield 44 with a wiper assembly 10. As should be apparent from this description, that method includes the steps of heating a wiper blade 14 of the wiper assembly 10, sweeping the wiper blade across the windshield between a bottom stroke position illustrated at P1 in FIG. 4 and a top stroke position illustrated at P2 in FIG. 4 and activating, by the controller 22, the light source 16 carried on the wiper assembly only when the wiper blade is adjacent the bottom stroke position.

In addition, a method of welcoming an operator as the operator approaches the motor vehicle is provided. That method includes the steps of locating a light source 16 on a wiper arm 12 of the motor vehicle and activating that light source via the controller 22 when the operator approaches the motor vehicle.

The foregoing has been presented for purposes of illustration and description. It is not intended to be exhaustive or to limit the embodiments to the precise form disclosed. Obvious modifications and variations are possible in light of the above teachings. For example, the wiper assembly may also include a resistance heating element in the windshield 44 to provide heated park zone for heating the wiper blade and the windshield when the wiper blade is resting at the bottom stroke position P1. Together, the heated wiper blade 14 and the heated park zone function to quickly free a frozen wiper blade from the windshield. All such modifications and variations are within the scope of the appended claims when interpreted in accordance with the breadth to which they are fairly, legally and equitably entitled.

What is claimed:

1. A wiper assembly, comprising:
    a wiper arm;
    a wiper blade carried on said wiper arm;
    a heating element;
    a light source carried on an inside surface of said wiper arm where said light source is easily visible to an operator of a motor vehicle upon which said wiper assembly is incorporated; and
    a control module having a controller configured to control operation of said light source and said heating element and activate said light source only when said wiper blade is adjacent a bottom stroke position.

2. The wiper assembly of claim 1, wherein said light source and said heating element are connected with a common ground.

3. The wiper assembly of claim 1, wherein said controller is configured to (1) ramp up light intensity from said light source when said wiper blade approaches said bottom stroke position and said light source is activated and (2) ramp down said light intensity from said light source when said wiper blade rises from said bottom stroke position and said light source is deactivated.

4. The wiper assembly of claim 1, wherein said controller is configured to vary light intensity of said light source based upon current ambient light intensity.

5. The wiper assembly of claim 1, wherein said controller is configured to activate said light source and said heating element when (a) precipitation is detected, (b) ambient temperature is below a predetermined temperature, (c) an ignition of a motor vehicle to which the wiper assembly is connected is switched off and (d) an operator approaches said motor vehicle.

6. The wiper assembly of claim 5, wherein said controller is configured to operate said light source and said heating element (1) at a first intensity level when (a) said precipitation is detected, (b) said ambient temperature is below said predetermined temperature, (c) said ignition is switched off and (d) said operator approaches said motor vehicle and (2) at a second intensity level once said ignition is subsequently switched on wherein said first intensity level is greater than said second intensity level.

7. The wiper assembly of claim 1, wherein said controller is configured to operate said light source and said heating element at a raised intensity when precipitation is detected on a windshield and ambient temperature is below a predetermined temperature.

8. The wiper assembly of claim 1, wherein said light source emits visible light in red frequency range.

9. A wiper assembly, comprising:
a wiper arm;
a wiper blade carried on said wiper arm;
a heating element for heating said wiper blade;
a light source; and
a controller configured to activate said light only when said wiper blade is adjacent a bottom stroke position.

10. The wiper assembly of claim 9, wherein said controller is configured to (1) ramp up light intensity from said light source when said wiper blade approaches said bottom stroke position and said light source is activated and (2) ramp down said light intensity from said light source when said wiper blade rises from said bottom stroke position and said light source is deactivated.

11. A wiper assembly, comprising:
a wiper arm;
a wiper blade carried on said wiper arm;
a light source carried on an inside surface of said wiper arm where said light source is easily visible to an operator of a motor vehicle upon which said wiper assembly is incorporated; and
a controller configured to vary light intensity of said light source based upon current ambient light intensity.

12. A wiper assembly, comprising:
a wiper arm;
a wiper blade carried on said wiper arm;
a heating element for heating said wiper blade;
a light source; and
a controller configured to activate said light source and said heating element when (a) precipitation is detected, (b) ambient temperature is below a predetermined temperature, (c) an ignition of a motor vehicle to which the wiper assembly is connected is switched off and (d) an operator approaches said motor vehicle.

13. The wiper assembly of claim 12, wherein said controller is configured to operate said light source and said heating element (1) at a first intensity level when (a) said precipitation is detected, (b) said ambient temperature is below said predetermined temperature, (c) said ignition is switched off and (d) said operator approaches said motor vehicle and (2) at a second intensity level once said ignition is subsequently switched on wherein said first intensity level is greater than said second intensity level.

14. A wiper assembly for a motor vehicle, comprising:
a wiper arm;
a wiper blade carried on said wiper arm;
a heating element for heating said wiper blade;
a light source carried on said wiper arm; and
a controller configured to operate said light source and said heating element at a raised intensity when precipitation is detected on a windshield and ambient temperature is below a predetermined temperature.

* * * * *